(12) United States Patent
Jolly et al.

(10) Patent No.: US 9,309,080 B2
(45) Date of Patent: Apr. 12, 2016

(54) BONDING OF NONWOVEN MATERIALS

(75) Inventors: Marc Jolly, Annaberg-Buchholz (DE); Michael Groschopp, Ehrenfriedersdorf (DE); André Lang, Sehmatal-Cranzahl (DE); Roland Fischer, Radeberg (DE)

(73) Assignee: Norafin Industries GmbH, Mildenau (DE)

( * ) Notice: Subject to any disclaimer, the term of this patent is extended or adjusted under 35 U.S.C. 154(b) by 868 days.

(21) Appl. No.: 13/561,375

(22) Filed: Jul. 30, 2012

(65) Prior Publication Data

US 2013/0025767 A1 Jan. 31, 2013

(30) Foreign Application Priority Data

Jul. 30, 2011 (DE) .................... 20 2011 103 915 U

(51) Int. Cl.
| | | |
|---|---|---|
| *B32B 37/00* | (2006.01) | |
| *B65H 21/00* | (2006.01) | |
| *D04H 3/11* | (2012.01) | |
| *D04H 1/48* | (2012.01) | |
| *B29C 65/00* | (2006.01) | |
| *D04H 1/49* | (2012.01) | |

(52) U.S. Cl.
CPC ................. *B65H 21/00* (2013.01); *D04H 1/48* (2013.01); *D04H 3/11* (2013.01); *B29C 65/002* (2013.01); *B29C 66/1122* (2013.01); *B29C 66/303* (2013.01); *B29C 66/43* (2013.01); *B29C 66/71* (2013.01); *B65H 2701/177* (2013.01); *D04H 1/49* (2013.01)

(58) Field of Classification Search
CPC ........... B65H 21/00; D04H 3/11; D04H 1/49; D04H 1/48
USPC ............ 156/73.1, 73.42, 73.4, 157, 158, 73.2
See application file for complete search history.

(56) References Cited

U.S. PATENT DOCUMENTS

| | | | |
|---|---|---|---|
| 687,260 A | | 11/1901 | Parker |
| 3,498,874 A | * | 3/1970 | Evans et al. .................... 428/134 |
| 3,858,819 A | | 1/1975 | Butler, Jr. |
| 4,157,934 A | | 6/1979 | Ryan et al. |
| 5,232,529 A | * | 8/1993 | Miyake ........................ 156/73.4 |
| 2006/0016571 A1 | * | 1/2006 | Silakoski .................... 162/358.2 |
| 2011/0133016 A1 | | 6/2011 | Sanders et al. |

FOREIGN PATENT DOCUMENTS

| | | |
|---|---|---|
| DE | 10022405 | 11/2001 |
| DE | 202009007662 | 10/2009 |
| GB | 1006570 | 10/1965 |
| JP | 62167160 | 7/1987 |
| WO | 2011114254 | 9/2011 |

* cited by examiner

*Primary Examiner* — James Sells
(74) *Attorney, Agent, or Firm* — Sughrue Mion, PLLC

(57) ABSTRACT

This invention relates to a technology for bonding pieces of nonwoven material to each other by fluid entanglement or needling technology.

15 Claims, 3 Drawing Sheets

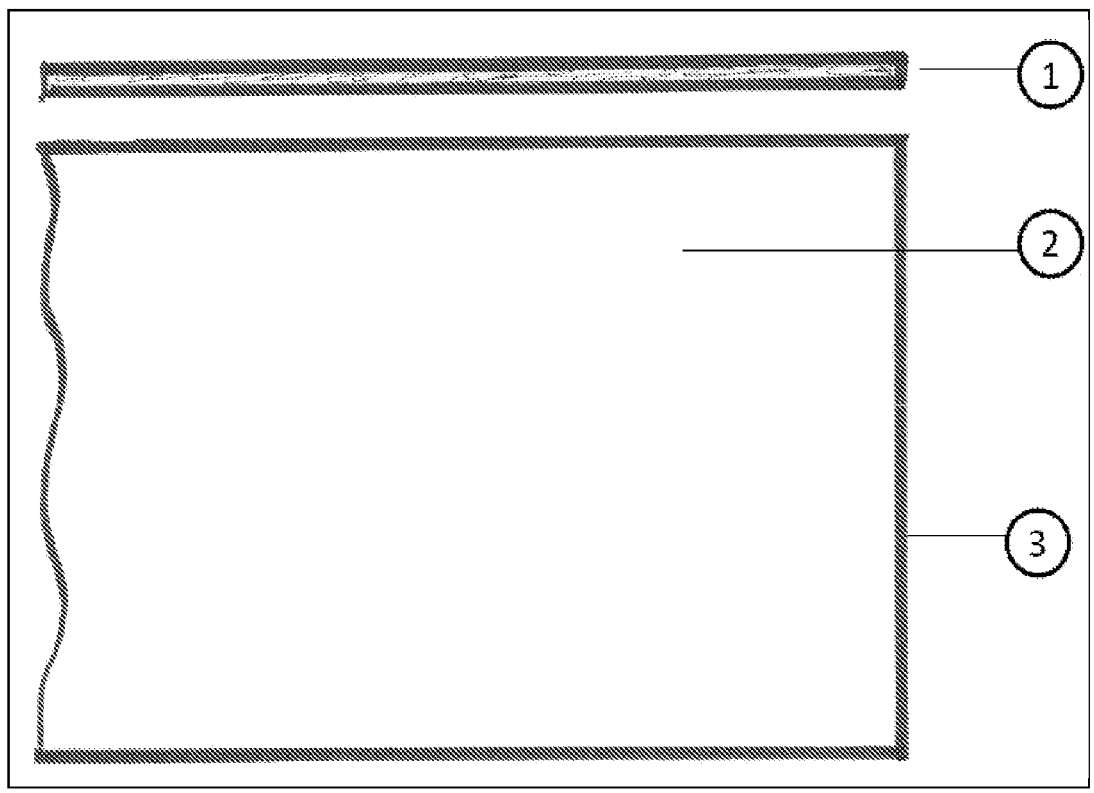
Figure 1: Nonwoven starting material

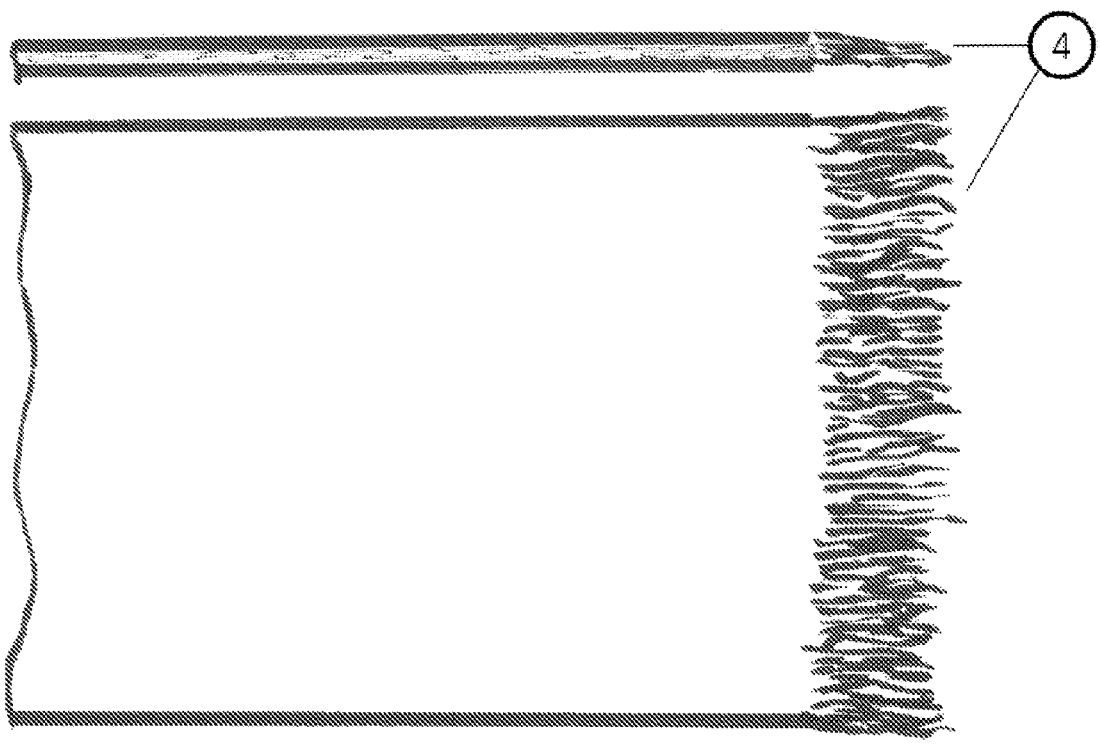
Figure 2: Nonwoven material with combed-out fiber ends (stage 1)
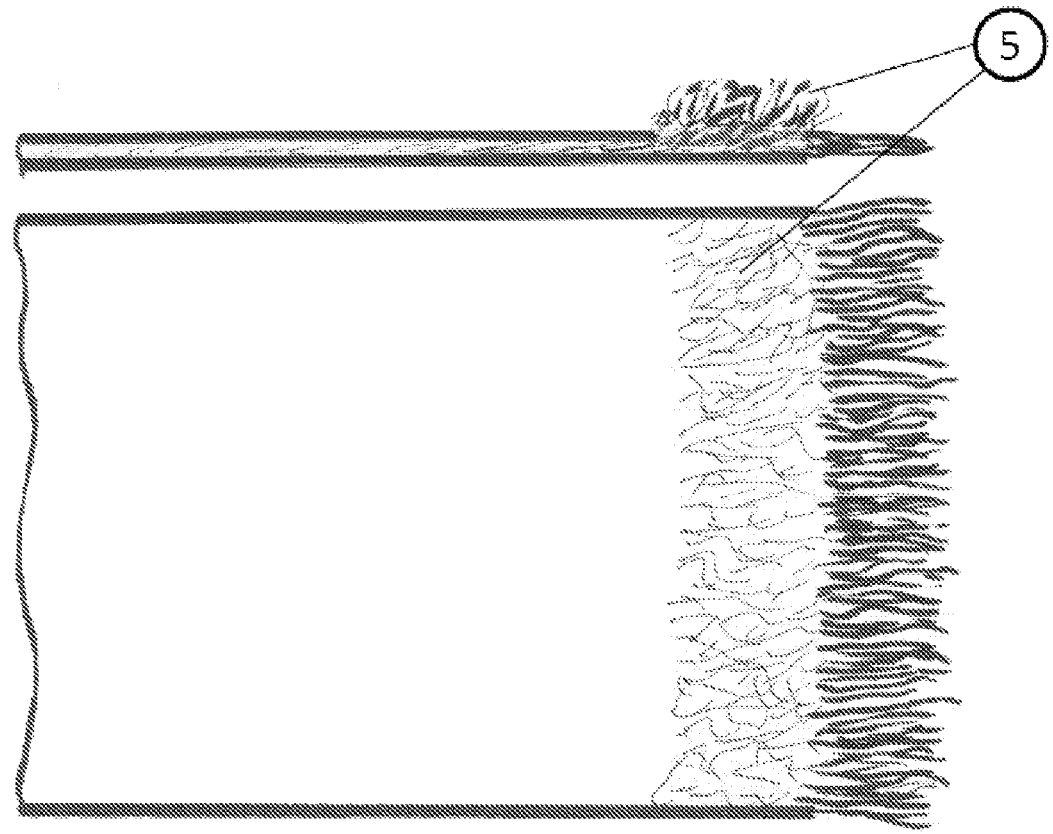
Figure 3: Nonwoven material with combed-out fiber ends (stage 1) and a partly unraveled fiber network (stage 2)

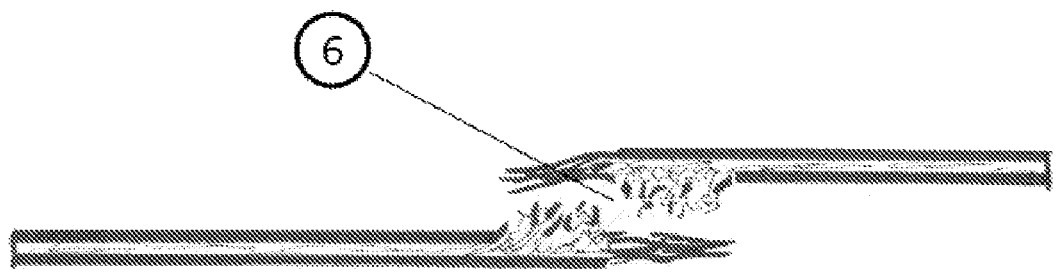
Figure 4: Ends of nonwoven material in a position for entangling
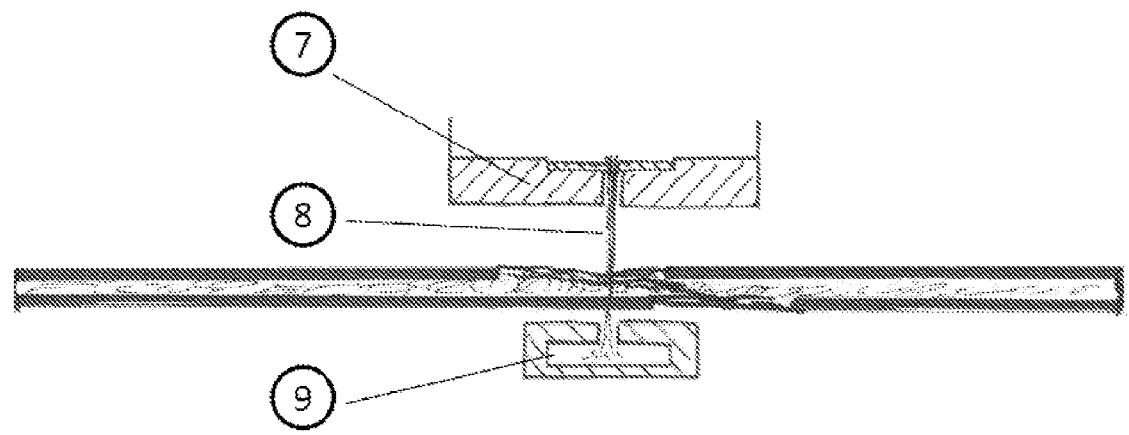
Figure 5: Overlapping layers of nonwoven material during entangling

BONDING OF NONWOVEN MATERIALS

CROSS-REFERENCE TO RELATED APPLICATIONS

This application claims under 35 U.S.C. §119(a) the benefit of German Patent Application No. 20 2011 103 915.7, filed Jul 30, 2011 the entire contents of which is incorporated herein by reference.

TECHNICAL DESCRIPTION

The technical field of this invention relates to a technology for bonding nonwoven materials.

Normally, equipping and/or processing nonwoven materials requires large areas (running lengths) which may, depending on the application, not show a junction having material properties differing from those of the fabric area. Producing a large fabric length flawlessly in one piece can be difficult. Depending on the process, there is a need for bonding rolls or pieces of nonwoven material.

Bonding individual pieces of nonwoven material by sewing and glueing technologies leads to a formation of an area at the junction which can show nonwoven material properties (for instance a mass per area, a thickness, a wetting behavior, a tear strength, an introduction of a foreign material and the like) differing significantly from those of the pieces of nonwoven fabric to be connected.

In the field of bonding pieces of nonwoven material, the prior art shows a glueing of the end of a textile web to a following web part by adhesive strips (U.S. 000003858819A, U.S. 000004157934 A, JP 000062167160 A, GB 000001006570 A). Therefrom, overlapping areas result which have significantly different properties (material thickness, weight per area, tear strength, introduction of foreign material and the like) than the roll material. The same applies, if the two pieces of nonwoven material are joined to each other edge-by-edge by an adhesive or an adhesive foil. A further possibility is sewing the ends of the nonwoven material, which shall be joined. However, this again implies an overlap of the nonwoven materials and a discontinuity regarding the nonwoven material properties thus, or, even though the two pieces of nonwoven material are sewed edge to edge, a foreign material being introduced, namely the sewing thread material.

For these reasons, the object of the invention is to develop a method for bonding two or more pieces of nonwoven material to an integral structure, wherein the joined fabric shall, also in the bonding area, fulfill the minimum requirements which apply for the fabric area; ideally, the bonding area does not differ from the fabric area in its visual appearance.

According to the invention, this problem is solved by a two-stage process:

1. Preparation prior to the hydro-splicing

The roll material is rolled up by winders straightly or, depending on the requirement, also obliquely to the fabric transport direction, for instance at an angle of 20° at minimum and 160° at maximum, and shall be free of fluctuations regarding the mechanical tension. Close to the end of the line, the outer layer of this so-formed roll is fixed by a locking roller so that the tension of the fabric is maintained. A non-occupied roller axis is equipped with a further roll and the back end of the material of the first roll as well as the front end of the material of the second roll are moved away from the unrolling position, out of the machine. There, the two ends are bonded together in an appropriate manner.

2. Main process hydro-splicing and after treatment

For the actual splice process, the two ends of nonwoven material are combed-out side-inverted obliquely to/in the machine transport direction, approximately over the last 10 mm of the end of the line until individual fibers are obtained (also referred to as "unraveling"); the adjacent region, approximately 10-50 mm, is unraveled partially (see FIG. 3). This procedure shall be performed very thoroughly (at the moment manually) and smoothly. However, also a machine setup is possible which will presumably lead to a smoother and more precise processing and to an increased reproducibility.

The combing-out until obtaining individual fibers is performed in an end region of the respective nonwoven material, which for instance extends over at least 10 mm, 12 mm, 14 mm, 16 mm (in this order increasingly preferred) of the end of the nonwoven material; independent of this lower limit, upper limits can for instance be 50 mm, 45 mm, 40 mm, 35 mm, 30 mm, 25 mm (in this order increasingly preferred). Particularly preferred, a region extending over the last 20 mm is combed-out until individual fibers are obtained.

The region adjacent thereto, which is combed-out/unraveled partly, can for instance extend over at least 10 mm, 15 mm, 20 mm, 25 mm, 30 mm, 35 mm (in this order increasingly preferred); independent of this lower limit, upper limits can for instance be 50 mm, 48 mm, 46 mm, 44 mm, 42 mm (in this order increasingly preferred). A length of 40 mm is particularly preferred.

Thereafter, the two ends to be joined are fixed in an apparatus in such a way that they overlap each other so that the nonwoven material area being partly unraveled is respectively aligned with the nonwoven material area being unraveled until individual fibers are obtained of the respectively other nonwoven material end. This apparatus is fixed in a frame so that only that strip of material is exposed, which shall be entangled.

In a next stage, the bonding area with the two nonwoven material ends combed-out and fixed respectively is treated in the frame by hydroentanglement, wherein the water is drained downwards. Therein, the fiber ends of the bonding area are laid across the material cross-section by a (moveable) water-jet nozzle bar above and/or below, whereby the material is entangled. This processing stage can be performed mutually a number of times, if applicable by implying a varying nozzle pressure.

Thereafter, the material lots are rolled back to the winder, the locking roller is released, and the winding procedure is regularly continued.

The ends of the nonwoven material arranged overlapping and being preferably combed-out according to the invention can, in addition to the bonding by hydroentanglement or needling technology, be also bonded by an ultrasonic treatment; the ultra-sonic treatment shall also be disclosed independent of the features of claim 1, namely independent of the bonding by hydroentanglement or needling technology.

EXEMPLARY EMBODIMENT

Stage 1

As a template for the splice process, at least two lines of nonwoven material being hydroentangled or needle-punched respectively are applied (see FIG. 1).

FIG. 2 shows an exemplary fabric prepared for the splice process. On the face, fibers have been combed out by a wire-brush roll so that in an area at the edge merely individual fiber ends protrude in the fabric transport direction (stage 1).

In stage 2 (see FIG. 3), the fiber network is only slightly treated so that the mass of the fabric is only slightly reduced in this area by removing individual fibers.

Stage 2

Two as-prepared nonwoven material ends are laid one on top of the other with the processed side, respectively, so that stage 1 of the one end is aligned with stage 2 of the opposing end respectively (see FIG. 4). The mass per area of stage 1 and stage 2 can in sum basically amount to the mass per area of the fabric area; ideally, it will be identical thereto.

Stage 3

FIG. 5 shows the relative arrangement of the two nonwoven material ends which shall be entangled. They are fixed in a frame for the further processing. Above the material lines, a moveable nozzle bar (7) is provided, which is alternately moved to the right and to the left over the nonwoven material lines in a defined manner and entangles the nonwoven material lines with each other by bonding the loose fiber ends over the material cross section by applying a stepwise increasing nozzle pressure. The excess water is drained at the opposite side of the fabric by a vacuum suction device (9).

The nozzle bar (7) is alternately moved from the right to the left and vice versa over the nonwoven material lines, for instance at least one time, five times, ten times and, independent thereof, for instance not more than 40 times, 35 times, 30 times, also depending on the type and mass per area of the respective nonwoven material. The water pressure, in particular the water pressure increased stepwise, can for instance amount to at least 10 bar, 20 bar, 30 bar, 40 bar, 50 bar (in this order increasingly preferred); independent of this lower limit, upper limits can for instance be 300 bar, 250 bar, 200 bar, 150 bar, 120 bar (in this order increasingly preferred). The nozzle bar can comprise one or several bars with nozzles; the holes in the nozzle bars can be arranged in a row, in parallel or with an offset to each other.

LIST OF REFERENCE SIGNS (AS REFERRED TO ABOVE AND IN DRAWINGS)

1) Nonwoven material in a cross-section
2) Nonwoven area material (top view)
3) Cutting edge obliquely to the fabric transport direction
4) Combed-out nonwoven material ends (stage 1)
5) Partly unraveled fiber network, bond; (stage 2)
6) Ends of nonwoven materials prepared and aligned with each other
7) Water-jet nozzle
8) Water-jets
9) Suction unit (vacuum)

The invention claimed is:

1. A method of bonding nonwoven materials wherein a bonding area of non-woven material pieces is realized, which shows almost the same properties in comparison a non-bonding area,
by one of thinning, in particular chemical unraveling, and combing-out nonwoven material ends at the bonding area,
by fixing said nonwoven material ends in an overlapping manner, and by subsequent fluid entanglement or needle-punching.

2. The method according to claim 1, wherein said end areas of said nonwoven material pieces are combed-out in a one-stage or a multi-stage process which results in bonding areas having a different width, depending on the type of material or the material thickness.

3. The method according to claim 1, wherein said combing-out is performed manually.

4. The method according to claim 1, wherein said combing-out is performed by machine.

5. The method according to claim 1, wherein said nonwoven material pieces consist of staple fibers of any material or material blends.

6. The method according to claim 1, wherein said nonwoven material pieces are at least one of the group of organic, for instance synthetic fibers such as polyester, polyacrylonitrile, aramid; natural fibers such as viscose, cotton, flax; and inorganic, such as based on silicate, on basalt, glass fibers.

7. The method according to claim 1, wherein different water-jet pressures can be applied.

8. The method according to claim 1, wherein water is applied for said fluid entanglement.

9. The method according to claim 1, wherein a combing-out until obtaining individual fibers is performed in an end region of the respective nonwoven material, which extends over 10 mm at minimum and 50 mm at maximum.

10. The method according to claim 1, wherein a combing-out until obtaining individual fibers is performed in an end region of the respective nonwoven material and wherein in a region adjacent thereto combing-out is performed partly, wherein said region adjacent thereto extends over 10 mm at minimum and 50 mm at maximum.

11. The method according to claim 1, wherein a water-jet pressure is 10 bar at minimum and 300 bar at maximum.

12. The method according to claim 1, wherein said nonwoven materials provided in an overlapping manner are bonded by an ultrasonic treatment.

13. A method of bonding a first nonwoven material to a second nonwoven material at a bonding area defined by an end portion of said first nonwoven material and an end portion of said second nonwoven material, bound material at said bonding area having almost the same properties in comparison to said first or second nonwoven material, comprising:
thinning nonwoven material in said end portions of said first nonwoven material and said second nonwoven material to form fiber ends at said end portions;
overlaying the fiber ends of said first nonwoven material and said second nonwoven material in said bonding area, and
interlacing said overlaying fiber ends by at least one of fluid entanglement or needle-punching.

14. The method according to claim 13, wherein said thinning is performed by chemical unraveling.

15. A method of bonding a first nonwoven material to a second nonwoven material at a bonding area defined by an end portion of said first nonwoven material and an end portion of said second nonwoven material, bound material at said bonding area having almost the same properties in comparison to said first or second nonwoven material, comprising:
combing-out nonwoven material in said end portions of said first nonwoven material and said second nonwoven material to form fiber ends at said end portions;
overlaying the fiber ends of said first nonwoven material and said second nonwoven material in said bonding area, and
interlacing said overlaying fiber ends by at least one of fluid entanglement or needle-punching.

* * * * *